US007274380B2

(12) United States Patent
Navab et al.

(10) Patent No.: US 7,274,380 B2
(45) Date of Patent: Sep. 25, 2007

(54) AUGMENTED REALITY SYSTEM

(75) Inventors: Nassir Navab, Plainsboro, NJ (US); Xiang Zhang, Lawrenceville, NJ (US); Yakup Genc, Plainsboro, NJ (US); Vijay Kumar, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 978 days.

(21) Appl. No.: 10/263,578

(22) Filed: Oct. 3, 2002

(65) Prior Publication Data
US 2003/0080978 A1   May 1, 2003

Related U.S. Application Data

(60) Provisional application No. 60/326,961, filed on Oct. 4, 2001.

(51) Int. Cl.
*G09G 5/00* (2006.01)
(52) U.S. Cl. ............... 345/633; 382/181; 382/190; 382/205
(58) Field of Classification Search ............ None
See application file for complete search history.

(56) References Cited

U.S. PATENT DOCUMENTS

| | | | | |
|---|---|---|---|---|
| 6,116,507 A * | 9/2000 | Fukuda et al. | ............... | 235/454 |
| 6,236,412 B1 * | 5/2001 | Ojima | ............... | 345/474 |
| 6,587,783 B2 * | 7/2003 | Navab et al. | ............... | 701/200 |
| 6,751,344 B1 * | 6/2004 | Grumbine | ............... | 382/154 |
| 6,765,569 B2 * | 7/2004 | Neumann et al. | ............... | 345/419 |
| 6,917,692 B1 * | 7/2005 | Murching et al. | ............... | 382/103 |
| 7,120,296 B2 * | 10/2006 | Shimoyama | ............... | 382/165 |
| 2002/0075201 A1 * | 6/2002 | Sauer et al. | ............... | 345/7 |
| 2002/0140708 A1 * | 10/2002 | Sauer | ............... | 345/633 |

OTHER PUBLICATIONS

Author: Kato et al., Title: "Marker Tracking and HMD Calibration for a Video-based Augmented Reality Conferencing System", Date: 1999, Publisher: IEE Int., pp. 1-9.*
Author: Koller et al., Title: "Real-time Vision-Based Camera Tracking for Augmented Reality Applications", Date: 1998, Publisher: ACM Press, pp. 1-6.*

* cited by examiner

*Primary Examiner*—Mark Zimmerman
*Assistant Examiner*—David H. Chu
(74) *Attorney, Agent, or Firm*—Donald B. Paschburg; F. Chau & Associates, LLC.

(57) ABSTRACT

An augmented reality system includes a video source, and a database. The video source resides at a location and produces an image. At least one encoded marker resides within the image. A marker detector is coupled to the video source and is adapted to derive encoded data from the marker residing within the image. A localization processor is adapted to receive data from the marker detector and to generate data regarding location and orientation of the marker. The localization processor retrieves information from the database that is related to the location and orientation of the marker. The localization processor makes the information retrieved from the database available to a user.

16 Claims, 6 Drawing Sheets

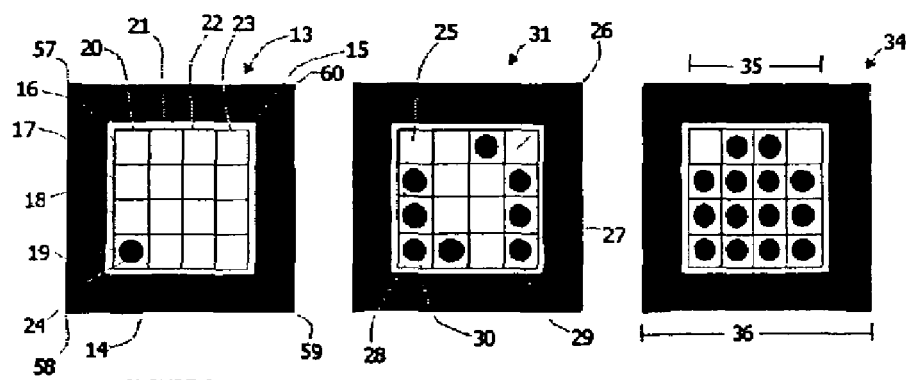
FIGURE 2a  FIGURE 2b  FIGURE 2c
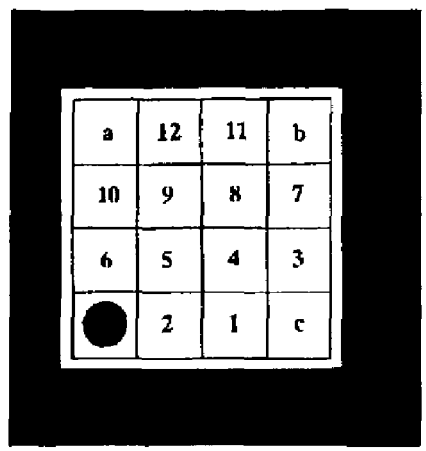
FIGURE 2d
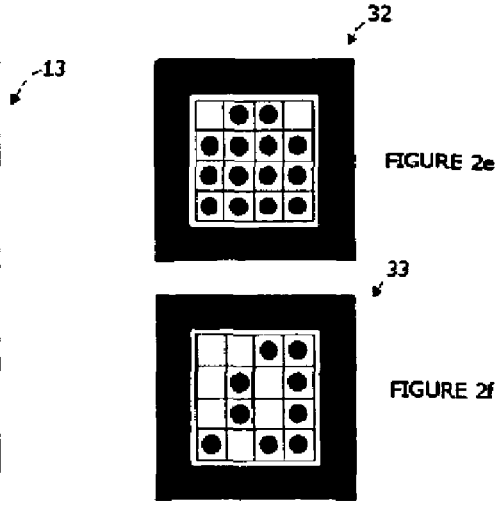
FIGURE 2e
FIGURE 2f

AUGMENTED REALITY SYSTEM

This patent application claims priority to U.S. Provisional Patent Application Ser. No. 60/326,961, entitled "Technologies For Computer Assisted Localization, Site Navigation, And Data Navigation" by Nassir Navab et al. filed Oct. 4, 2001.

FIELD OF THE INVENTION

The present invention relates generally to the field of augmented reality, and more specifically to the process of interacting with spatially sensitive data in a virtual environment.

BACKGROUND

Augmented Reality (AR) is a technology that enhances a person's view of the real world with virtual objects such as imagery and textual data. While a virtual reality system places the user in a totally synthetic computer generated environment, an AR system merges computer synthesized objects with the user's space in the real world. In an AR system computer generated graphics enhance the user's interaction with and perception of the real world. For example, in industrial operations different entries in a factory database may need to be accessed depending on the user's location within the factory environment. Real time operational data and maintenance information may be stored on a remote server that is accessible at the factory site. Ideally a user could access and view manuals and current operating parameters of various components and equipment as the user moved through the factory. Similarly, this type of information could be viewed remotely by engineers and technicians when maintenance is being performed by an automated device or in a training scenario. In a particularly large factory the user may also need to be guided to an area of interest. An example of the use of augmented reality in such environments is disclosed in CYLICON: A SOFTWARE PLATFORM FOR THE CREATION AND UPDATE OF VIRTUAL FACTORIES by Navab et al., *Proceedings of the 7th IEEE International Conference on Emerging Technologies and Factory Automation*, pp. 459-463, Barcelona, Spain 1999.

A typical augmented reality system includes a display device and a tracking device with associated software housed in a mobile or wearable computer such as the Sony Vaio Picture-Book and the Xybernaut MAIV wearable computer. Such computers can be either worn or hand held and connected to a computer network via wireless communication. The software monitors tracking device events in order to determine the present position of the display in the real world and to retrieve virtual objects for use by the viewer. In order for the display to present the correct virtual objects, the virtual objects and the real world need to be in registration or synchronized in some fashion. A virtual object should appear at its proper place in the real world so that the user can correctly determine spatial relationships. Registration of the computer generated graphics should be dynamically adjusted in response to changes in the user's real world perspective.

Registration implies that the geometry of the virtual camera which is retrieving the augmentation data is known with respect to the real world. To be effective the tracking device must provide extremely accurate data concerning the real world view in order to ensure seamless rendering of the virtual objects as they are superimposed over the real world view. In typical state of the art AR systems, a virtual object often appears to waver or drift as the user moves, and does not appear to rest at the same location as the user views that location from several different positions. These defects in registration are typically due to shortcomings of the tracking system.

Many tracking systems use magnetic trackers, such as disclosed in U.S. Pat. No. 6,262,711, entitled COMPUTERIZED INTERACTOR SYSTEMS AND METHOD FOR PROVIDING SAME, issued to Cohen et al. Conventional magnetic trackers may be subject to large amounts of error and jitter and can exhibit errors on the order of ten centimeters, particularly in the presence of magnetic field disturbances such as metal and electrical equipment commonly found in factories. Carefully calibrating a magnetic system typically does not reduce position errors to less than two centimeters.

Other AR tracking systems use image recognition to track movement, and nearly perfect registration can be achieved under certain conditions. An example of an image or vision based system is disclosed in U.S. Pat. No. 6,330,356, entitled DYNAMIC VISUAL REGISTRATION OF A 3-D OBJECT WITH A GRAPHICAL MODEL, issued to Sundareswaran et al. Under some conditions such image recognition systems can become unstable. Instability usually originates with software embedded assumptions, which may or may not be accurate, that are made about the working environment and the user's movement in order to reduce computation costs.

Numerous attempts have been made to solve the registration problem. U.S. Pat. No. 6,064,749, entitled HYBRID TRACKING FOR AUGMENTED REALITY USING BOTH CAMERA MOTION DETECTION AND LANDMARK TRACKING, issued to Hirota et al., discloses the use of a concentric landmark or marker for use in conjunction with image recognition. The landmark includes a first dot of a first color and a ring concentric to the first dot. The ring is of a second color which is different from the first color. Typically the diameter of the ring is about three times the diameter of the dot. The Hirota et al. device includes an image analyzer that first views an image in search of areas whose color matches the outer ring of a concentric landmark and the attempts to locate the inner colored dot within the identified area. The applicants of the present invention have found through experimentation that the color coding of markers often results in instability of the classification protocol due to frequently changing illumination, such as might occur when moving from place to place within a factory environment.

Hoff et al. at the Colorado School of Mines has also developed an observer pose determination system based on concentric circular markers. See Hoff, W. A.; Lyon, T. and Nguyen, K. "Computer Vision-Based Registration Techniques for Augmented Reality," *Proc. of Intelligent Robots and Computer Vision* XV, vol. 2904, in *Intelligent Systems and Advanced Manufacturing*, SPIE, Boston, Mass., pp. 538-548 (1996). By processing a video image of the object with the markers in place the markers are isolated. Hoff et al. then uses an estimation algorithm to estimate the pose of the camera. These particular markers are cumbersome and require excessive computational resources.

SUMMARY OF THE INVENTION

In accordance with principles of the present invention an augmented reality system includes a video source, and a database. The video source resides at a location and produces an image. At least one encoded marker resides within the image. A marker detector is coupled to the video source and is adapted to derive encoded data from the marker residing within the image. A localization processor is adapted to receive data from the marker detector and to generate data regarding location and orientation of the marker. The localization processor retrieves information from the database that is related to the location and orientation of the marker. The localization processor makes the information retrieved from the database available to a user.

BRIEF DESCRIPTION OF THE DRAWINGS

FIGS. 2a-2f are pictorial examples of the coded visual markers of the present invention.

DETAILED DESCRIPTION OF THE INVENTION

Figure 1:
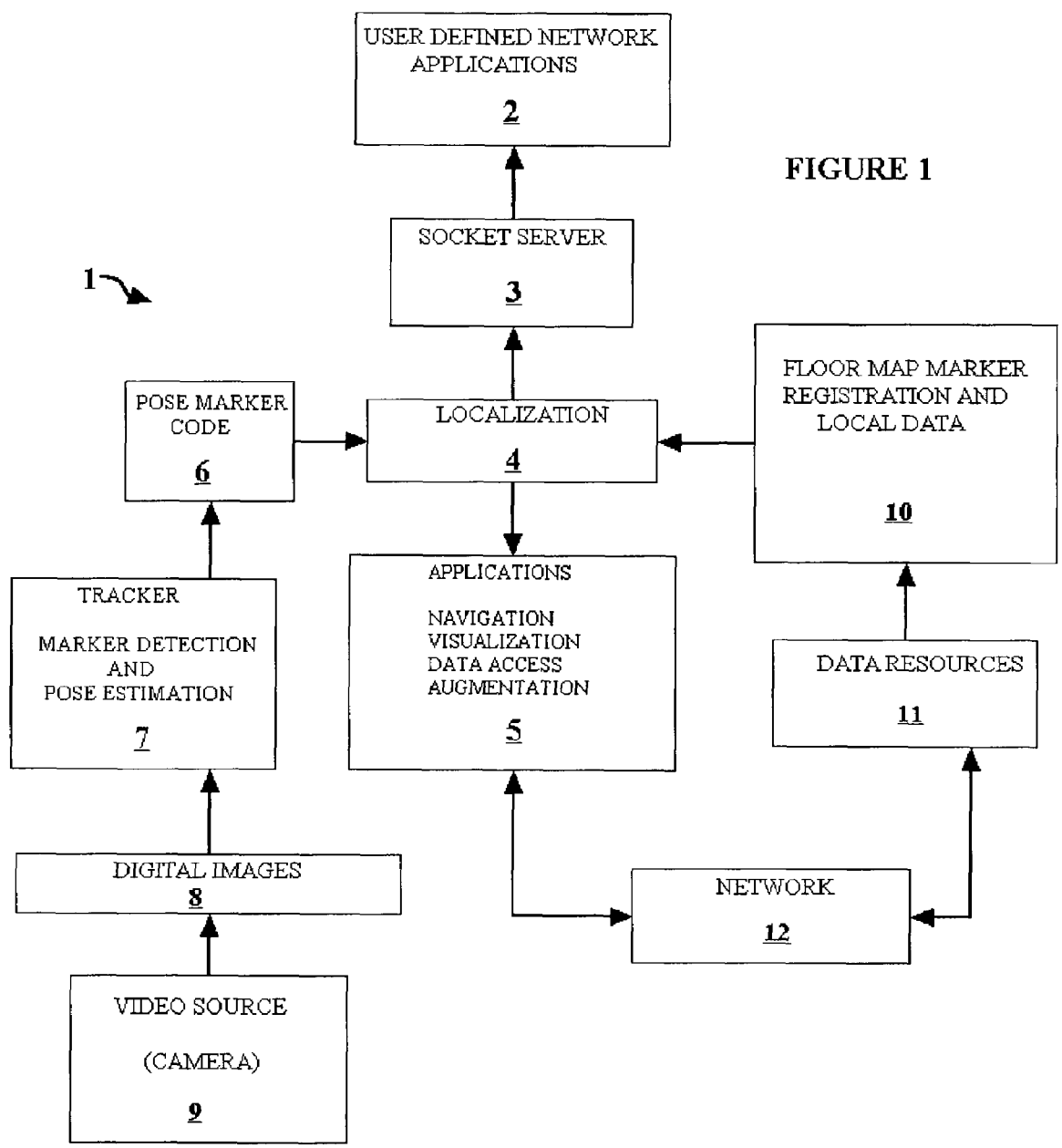
FIG. 1 is a block diagram of the present invention.

In general terms, the present invention is a system for site and data navigation for use, for example, in a large industrial environment. The system may be used in conjunction with mobile on-site computers and/or with stationary work stations, thereby permitting collaboration between on site and off site workers. A wireless network transfers data between a set of mobile computers (used for computer assisted navigation and data access), each including a camera and display device, and a main computer network. The system displays the floor plan or map of the work site, which may be enlarged or reduced in size, in the neighborhood of each mobile computer, and indicates the mobile computer's current location on that display. The mobile computer automatically retrieves the next new floor plan from the network and makes it available for display as soon as the mobile navigation computer detects a new location, as might occur when the user enters a new room in a building. Based on the position computed by the system the real time video captured by the camera can be augmented with text and three dimensional virtual objects to provide additional information to the user. In order to do this, the position and pointing direction of the camera in the work site, termed the pose of the camera, must be determined by the central computer system.

The present system computes the pose or vantage point of a camera by detecting and decoding a particular set of physical coded visual markers located at respective known fixed locations in the work space. In the illustrated embodiment, these visual markers are designed to permit the generation of a large number of discrete codes which may be both encoded and decoded by a novel algorithm. Each marker provides at least eight features or points to permit calculation of the position and orientation of the camera.

As described above, the mobile user can navigate through the virtual environment corresponding to the current work site. Registration of the work site with its virtual counterpart is accomplished by detecting the locations of physical markers in the camera image sent to the central computer. The locations of the markers in the physical work site are referenced to corresponding locations in the floor plans appearing in the virtual model. The user can also navigate through the data and virtual environment of the equipment residing at the work site. Relevant drawings, manuals and equipment are available for display when the system detects markers that are placed on equipment or structures within the factory. Physical navigational guidance is provided to the user by displaying appropriate paths on the floor plan maps. Necessary changes to suggested paths are also provided in real time in case of emergency or due to security reasons.

Whenever a mobile computer obtains a set of images via the camera, those images are registered with an existing virtual model in an off line process, the associated augmented images being created based on the data residing in the virtual model. The navigation system estimates the position of the mobile computer from the visual markers and then automatically retrieves an existing augmented view which is closest in location to the current position of the mobile computer. In this manner the user is provided with a precomputed augmented view which is very close to the user's current view. The user is able to alter the characteristics of the display used for presenting the augmented information. If the mobile computers further include audio capability, the user interface of the present system permits the use of voice commands to execute actions or to obtain information from the virtual model database. Responses from the system can take the form of either text displayed on the computer screen or synthesized speech.

The present invention also includes associating or linking the visual markers to Uniform Resource Locators or databases to serve as an entry or connection point to information that may be of interest to the user. The mobile computer can then automatically browse and display relevant data links. Access to corresponding databases and spatial data is regulated based on the user's identity and authorized access level. For example, a manager can access confidential design and process data while the typical maintenance worker can only access the necessary repair manuals.

Relevant data is cached by positional indexing to provide maximum data and network throughput. Factory data is typically voluminous and cannot be stored entirely within a mobile computer. Since usually only a small portion of the data is needed at one time, data is stored within the mobile computer according to the physical location and access level of the user, thereby reducing the occurrence of inadequate memory space or network overload. The present system permits users to simultaneously access and share information through sockets and a server. Users can share their views and positions with others, permitting managers, for example, to monitor the progress of a project and to better schedule work which must be performed in a particular sequence. Further, the system can monitor and record the activity of all users passing or encountering a particular marker. This can be used to insure that periodic maintenance is being performed and help identify inefficiencies in the manufacturing process.

Information may be associated with some or all of the visual markers. A note or reminder can be viewed by the intended user when that user reaches the appropriate marker. A security directive can instruct the user on how to proceed once the marker is reached. A mandatory warning message can alert users to existing problems and dangers in the vicinity of the marker.

Figure 5:
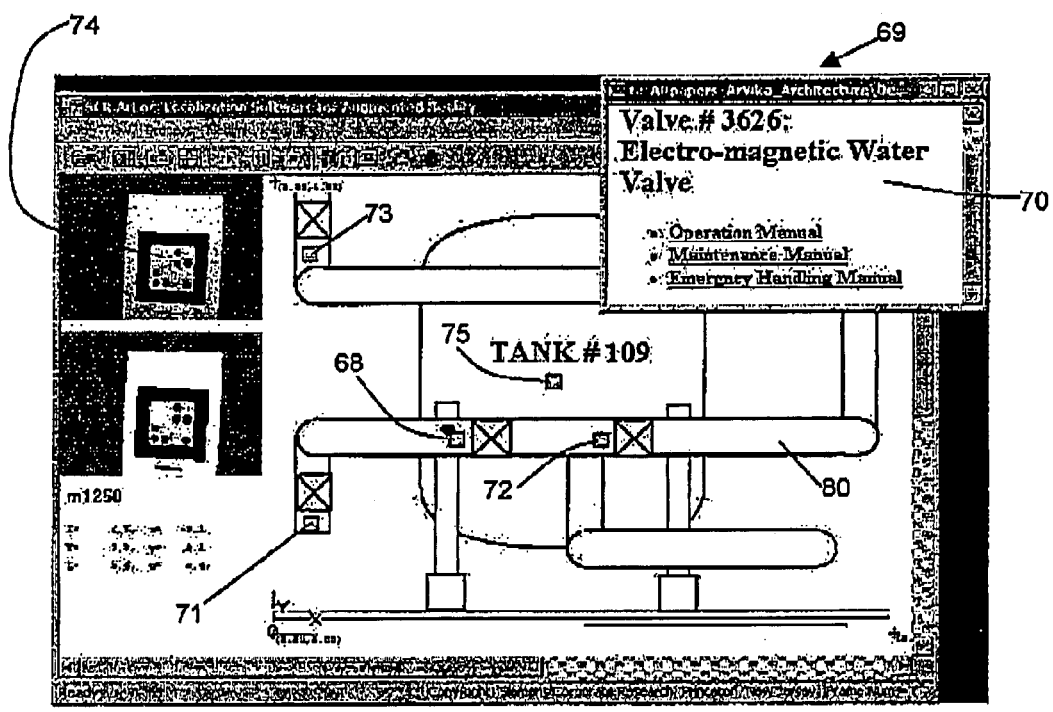
FIG. 5 is a pictorial representation of a second displayed view as created by the present invention.

The system, according to the present invention is described in more detail with reference to the drawings. In FIG. 1 the system 1 obtains real time video and digitized images 8 from the connected video source 9, which is typically an attached video camera or online video source. The digital images 8 are transferred to a tracker module 7 where the digitized images are processed. The tracker 7 is capable of detecting the coded markers 13 seen in FIGS. 2a-2f that are captured in the images 8. Referring also to FIG. 5, the markers 68, 71, 72, 73, and 75 are seen to reside on equipment within a factory environment and are visible in the displayed view 69. Tracker 7 is also responsible for computing the relative position or pose of the video source 9 with respect to the coded markers.

Referring to FIG. 2, each marker 13 includes a relatively thick rectangular frame 14 and a coding matrix 15 surrounded by the frame 14. While the matrix 15 may be of any size, in this embodiment the marker 13 includes a matrix 15 which is formed with four rows 16, 17, 18 and 19, and with four columns 20, 21, 22 and 23. Depending on the information to be encoded, one or more of the cells within matrix 15 is occupied by a circle 24. To avoid the instability associated with color based classification systems, the frame 14 and each the circle 24 are both black.

As seen in FIG. 2d, the marker 13 is encoded using a twelve bit binary number with each bit corresponding to a numbered position in the coding matrix 15. If a position, such as, for example, position '4' or '9' are filled or covered with the black circle then the corresponding bit of the twelve bit binary number has a value of one. For positions which are left blank, the corresponding bit of the twelve bit binary number has a value of zero. The markers 13, 31 are thus labeled by the value of the twelve bit binary number. For example, the twelve binary number represented by marker 13 is '0000 0000 0000', and that represented by marker 31 is, '0110 0110 0110'. When specifying the value of a marker, these binary values are converted to decimal, for example marker 13 is 0 and marker 31 is 1638.

Referring to FIG. 2b, the four corner positions 25, 26, 27 and 28 are reserved for the determination of marker orientation, and also provide additional values for the marker. In order to uniquely indicate the orientation of each marker 13, 31 the cell 25 (position a) is always vacant or white (i.e., a binary value of zero), while the cell 28 (position d) is always filled or covered with a black circle 30 (i.e., a binary value of one). Further, the protocol of the present invention requires that when cell 26 (position b) is filled (black), then cell 27 (position c) must also be filled (black). A letter is added to the end of the numeric value of each marker label to indicate one of three possible combinations:

The letter a is added for the condition when
cell 25(a) is vacant (0) and cells 26(b), 27(c) and 28(d) are filled (1);
(see FIG. 2f, representing marker number '1010 1010 1010'a or 2730a);
The letter b is added for the condition when
cells 25(a) and 26(b) are vacant (0) and cells 27(c) and 28(d) are filled (1);
(see FIG. 2e, representing marker number '1111 1111 1111'b or 4095b);
The letter c is added for the condition when
Cells 25(a), 26(b) and 27(c) are vacant (0) and cell 28(d) is filled (1);
(see FIG. 2a. representing marker number '0000 0000 0000'c or 0c).

Therefore, when using a four by four matrix as shown for markers 13 and 31, the maximum possible number of distinct marker codes is $$(3) \times (2)^{12} = (3) \times (4,096) = 12,288$$

In the case of a five by five matrix, the maximum possible number of distinct marker codes is $$(3) \times (2)^{21} = (3) \times (2,097,152) = 6,291,456$$

In general, for an n×m coding matrix, the number of unique marker codes is $(3) \times (2)^{((m \times n) - 4)}$. Following the labeling convention just described, the marker 32 (FIG. 2e) is labeled 4095b and the marker 33 (FIG. 2f) is labeled 1365a.

In order to detect the presence of a marker 13, tracker 7 (of FIG. 1) applies a watershed transformation to the marker 13, 31, 32, 33 image in order to extract the insulated low intensity regions of the marker and store their edges as closed edge strings. A one dimensional Canny edge detection procedure is applied to locate the edge of marker 13. The raw edge position data is first smoothed using a one dimensional Gaussian filter and then the absolute maximum derivative value is located using nonmaximum value suppression in the direction that is perpendicular to the first estimated edges.

Figure 3:
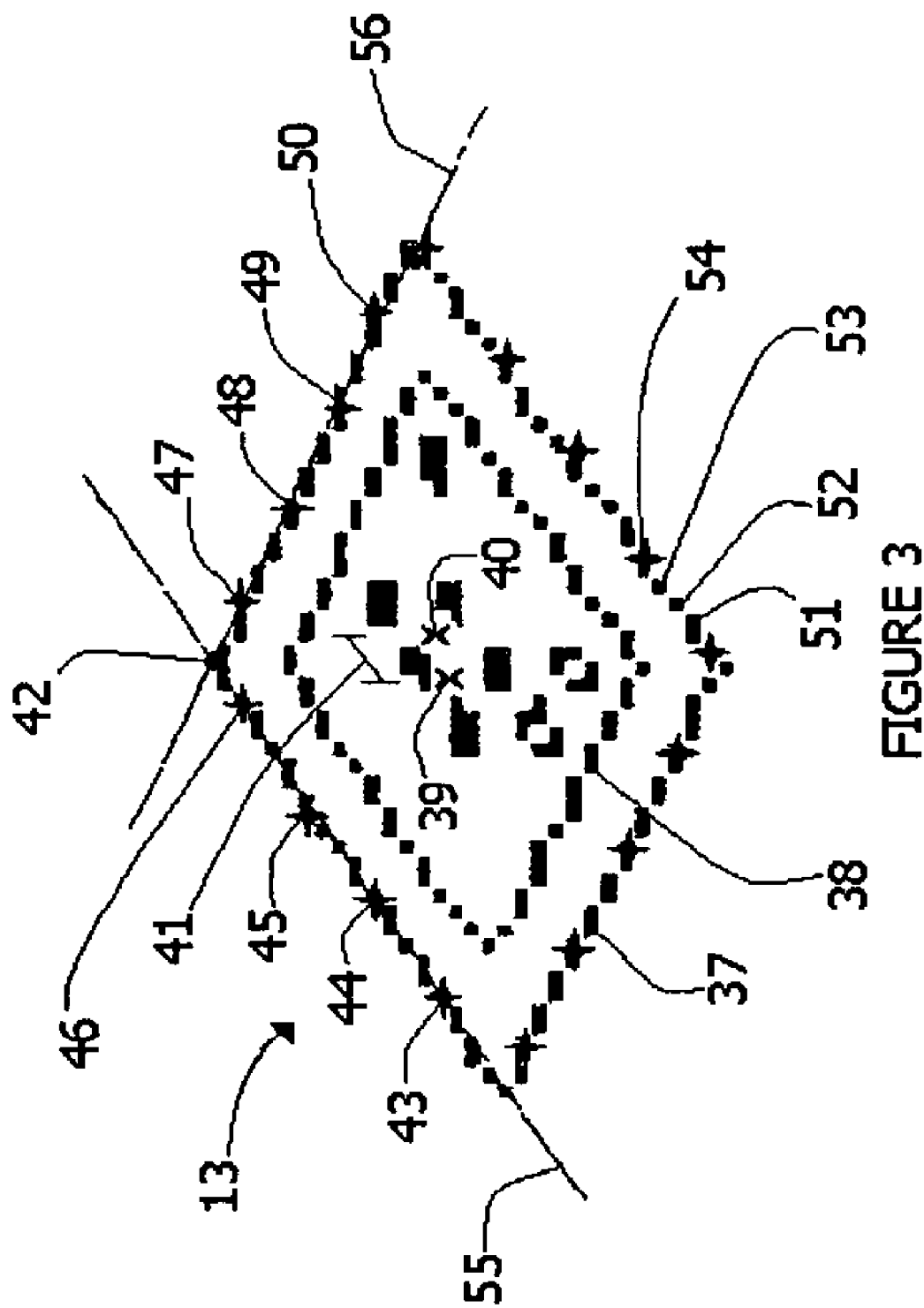
FIG. 3 is a pictorial representation of a marker depicting the manner of marker detection utilized in the present invention.

Referring also to FIG. 3, the next step in the marker detection process is to find two closed (i.e., defining some sort of enclosed region) edge strings 37 and 38 that have closely spaced centers of gravity or geometric centers 39 and 40, respectively. In other words, the tracker 7 must discover two closed edge strings 37, 38 that satisfy the equation:

$$d(i,j) \leq d\_thr,$$

where d(i,j) is the distance 41 between the weight centers 39 and 40 of the closed edge strings i and j; and
d_thr is an adjustable threshold defining the maximum permissible value for the distance 41.

An additional condition which must be satisfied in order for the two closed edge strings 37 and 38 to qualify as a possible marker contour is if li<lj, then c_low*lj≤li≤c_up*lj or if lj≤li, then c_low*li≤lj≤c_up*li, where li and lj are the total perimeter lengths (measured by the number of edge points) of the edge strings 37 and 38;
c_low is the coeffiecient for the lower limit of the edge string length; and
c_up is the coefficient for the upper limit of the edge string length.

For example, if the marker 34 depicted in FIG. 2c has an inner square width 35 that is 0.65 times the outer square width 36, then c_low would typically be approximately 0.5 and the value of c_up would typically be approximately 0.8. An additional condition to be applied when searching for a potential marker 13, 31, 34 is to determine if the bounding box of the shorter edge string is totally within the bounding box of the longer edge string.

Referring again to FIG. 3, in most cases, there is no extreme projective distortion of the marker 13 image and so the location of an outer corner 42 may be determined by sorting all of the edge points (such as edge points 51, 52, 53, 54, etc.) detected on the longer edge string 37. Once all of the edge points are sequentially connected, twenty evenly distributed edge points are selected that evenly divide the sorted edge string 37 into twenty segments. In the absence of extreme projective distortion there will typically be four to six points (such as points 43, 44, 45 and 46) on one side of the marker 13 and a similar number of points (such as points 47, 48, 49 and 50, for example) on an adjacent side of marker 13. In the case illustrated, the intersection 42 of line 55 fitted through points 43-46 and of line 56 fitted through points 47-50 will be the first estimate of a marker corner point 57 (FIG. 2*a*). The remaining corner points 58, 59 and 60 are estimated in a similar fashion.

Based on the estimated corner points 57-60 obtained by the foregoing approximation process, a more accurate determination is then made by using those initial estimates and all of the edge points 51-54, etc. of the edge string 37 to redraw the lines 55 and 56 and recalculate the intersection points 57-60. The final relationships of the marker corners are computed by applying the one dimensional Canny edge detection process to the first estimated edge locations to accurately locate the edge points of the square marker 13. Eight straight lines (four for the outer edge string 37 and four for the inner edge string 38) are then fitted from the recalculated edge points in order to calculate the corner points of marker 13 with subpixel accuracy.

Referring back to FIG. 2, using the geometrical correspondence of the eight corner points of marker 13, the holography (projection relation) between the marker plane and the image plane can be computed, thereby permitting recovery of the coding matrix 15 from the image. The black circles 24, 29, 30 etc. which define the coding matrix 15 are also useful as additional calibration points for the camera 9. The identification information contained within the markers 13, 31, 32, 33 is decoded according to the scheme described above by pose marker code detector 6 (of FIG. 1).

In some applications there is no need for so many (tens of thousands) distinctly coded markers, but there is always a need for maximum reliability in the decoding of the markers actually in use. In order to increase decoding robustness error correcting coding may be applied to the decoding of markers. For example, when using the four by four decoding matrix 15 there are as many as twelve bits available for numeric marker encoding and three alphabetic designations. Without considering automatic error correction there are conceivably 12,288 different markers available for use. According to the Hamming boundary theorem, a twelve bit binary signal can have thirty two ($2^5$) error corrected codes with the least Hamming distance being five, to which a two bit automatic error correction code can be applied. If only single bit automatic error correction coding is needed, the least Hamming distance is reduced to three, permitting the use of 256 ($2^8$) error corrected codes when using a twelve bit binary coding scheme.

Figure 4:
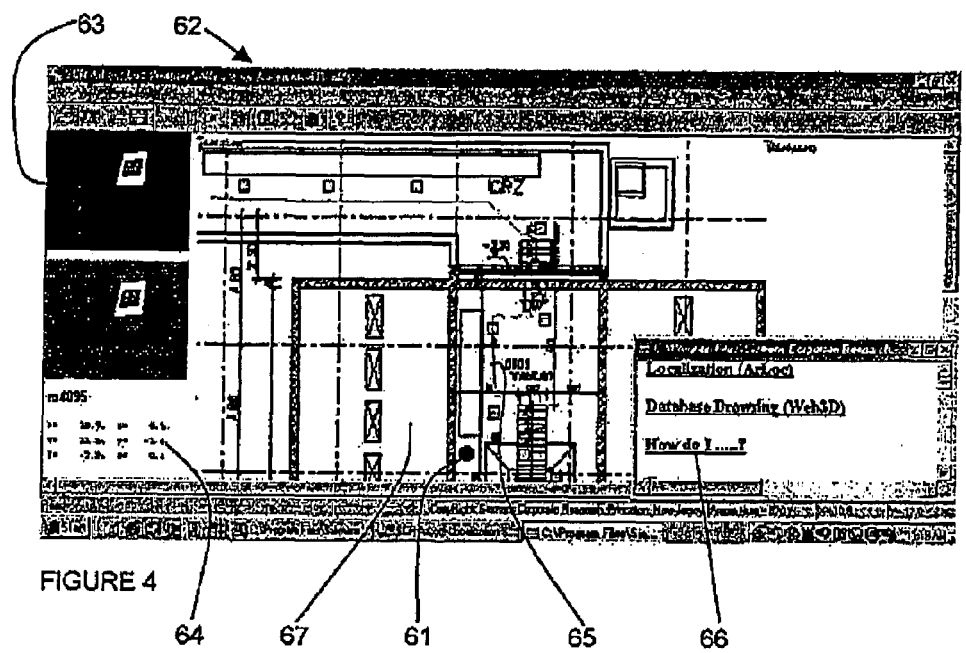
FIG. 4 is a pictorial representation of a first displayed view as created by the present invention.

Referring again to FIG. 1, the data obtained by pose marker code processor 6 is used by localization processor 4 to make a localization calculation. Any marker which is visible in the video image is analyzed. Based on the code of the marker 13 the absolute position and orientation of the marker 13 within a factory environment, for example, can be determined. This information can then be used to calculate the position of the mobile computer within the factory as well. The localization results are available to a number of applications 5. Referring to FIG. 4, one such application includes the display 62 of information including the graphical user's position 61 on a floor map 67 of the neighborhood of the mobile computer, with indicia such as arrows to assist the user with navigation 65 throughout the factory. Image augmentation 63, spatial data access 64 and interaction 66 may also be provided.

In executing these applications 5 the necessary data may be obtained locally from local data source 10 or it may be obtained through the computer network 12. The local data source 10 automatically furnishes the new floor plan via network 12 as soon as the tracker 7 detects any marker associated with the new floor plan, as might occur when the user enters a new room. As best seen in FIG. 5, when the system 1 detects markers 68, 71, 72, 73, 75 that are placed on equipment 80, the display 69 provides the user with the ability to select related manuals or other documentation via a menu 70. The particular marker being viewed by the user appears in the augmented view window 74 and the system 1 (of FIG. 1) retrieves the menu listing items related to the piece of equipment identified by the marker from, e.g. a data resource 11 such as a database.

Figure 6:
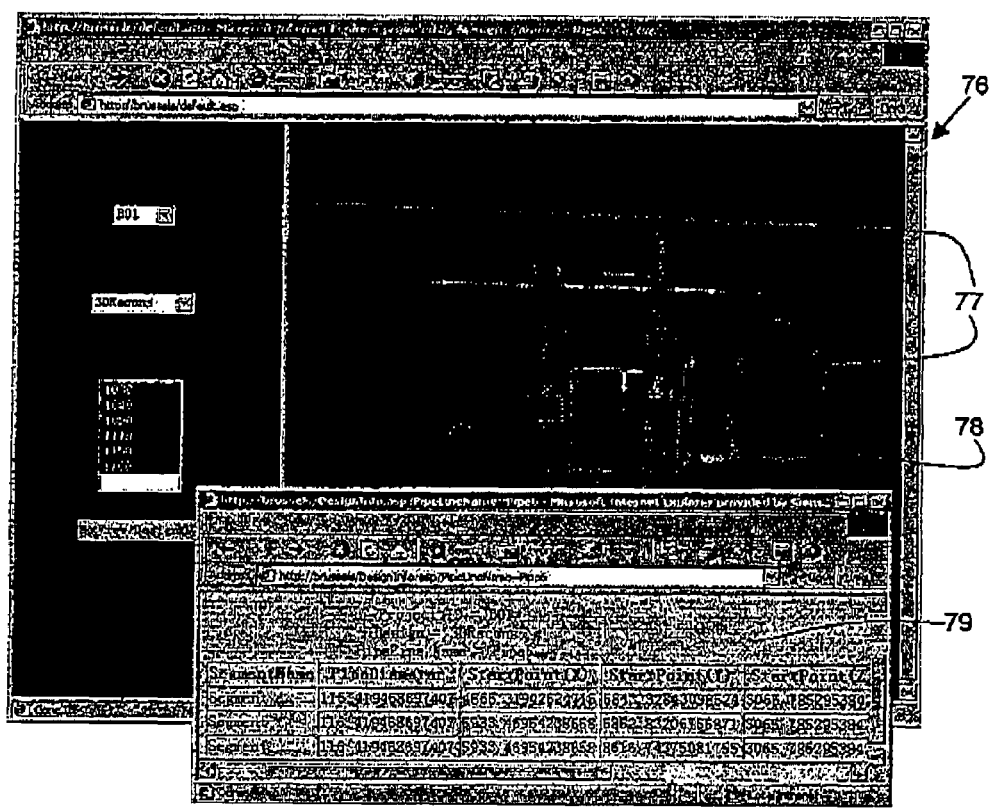
FIG. 6 is a pictorial representation of a third displayed view as created by the present invention.

Among the information contained in database 11 concerning the industrial site there are calibrated images used for accomplishing three dimensional reconstruction. The stored images are images of the virtual space as seen from a predetermined set of vantage points in virtual space. The central computer can generate a composite virtual scene which is composed of three dimensional real time video images and virtual structures and images, and can send that image to the mobile computer. When such a virtual scene is viewed at the mobile computer from the physical location corresponding to the vantage point of the center of virtual camera, the virtual structures and video images appear to be aligned. As best seen in FIG. 6, if the viewpoint in the virtual environment changes, the alignment between the virtual image of pipes 77 and the photographic image 78 of the same area will also change, as well as the displayed data access 79 information. The ideal location for the camera in the mobile computer to align the virtual image with the video image is at the location in the work site corresponding to the location of the virtual camera in virtual space. However, the camera is seldom in exactly the same location as the virtual camera. Thus, the predetermined virtual image which will generate the best alignment between the virtual and video image must be identified.

Such an augmented view 76 from the virtual environment is the closest best view available, and the vantage point from which the view is taken is the best viewing point. The present invention presents several methods to identify the predetermined best view and its best viewing point for a given set of marker detection and localization results. The simplest method is to associate a marker with a best view in the virtual environment generated from the three dimensional reconstruction database 11. Since the position of the marker may be set close to the corresponding viewpoint, only the marker decoding result is needed to determine the best view. A more accurate method of associating the best view and its best viewing point is to compute the distance between the three dimensional localization result and the nearest available best viewing points. If the closest available best viewing point is below a predetermined minimum value then that particular best view is assigned to the associated localization result.

In some situations the orientation (i.e. pointing direction) of the camera 9 is also needed in order to determine the best view for a given position. For example, at a position that has several best views taken from respective viewing points, both the position and the orientation of the camera are needed to choose the correct best view. When the camera 9 is pointing downwardly (at the ground) the best view will correspond to the position of the user's eyes, which are assumed to be pointing in a horizontal direction. The best viewing direction is determined by comparing the angular distance between the projection of the camera optical axis and a horizontal plane residing at a height equal to the height of the use's eyes above the ground. In the case when there is no restriction to the best viewing directions of best views residing in database 11, the best viewing direction is determined by checking the angular distance between the direction of each predetermined best view and the current direction of the camera optical axis. When alignment of the three dimensional reconstructed virtual view with the real time video is not of concern, the best viewing point and the best viewing direction coincide with the optical center and the optical axis, respectively, of the camera. The view of the virtual world is directly and continually updated in real time based on the localization results.

The localization results may also be made available to selected network applications 2, such as three dimensional navigation, by means of socket server 3. The user defined network applications 2 can obtain localization results from processor 4 and access the database 11. Database 11 contains images and data concerning the virtual environment. The network applications 2 can select the appropriate images and data based on localization information to create the best augmented reality views for the user and to permit the user to navigate through the three dimensional virtual environment. The user can also directly interact with the database 11 via the network 12.

The socket server 3 also permits qualified users to obtain localization information directly from other users. The socket server 3 permits a user to share their particular view with other users on the network 12. For example, a user could share her view with the manager in her office or a technical expert in an equipment control room. All three parties can thereby cooperate to solve a particular problem. As part of such an effort the technical expert can select the views of multiple users and provide each of them with the necessary guidance.

What is claimed is:

1. An augmented reality system, comprising:
   a video source, the video source residing at a location and producing an image;
   at least one encoded marker residing within the image, wherein the encoded marker is formed to store data within a matrix surrounded by a substantially opaque frame;
   a marker detector, coupled to the video source, adapted to derive encoded data from the marker residing within the image;
   a database; and
   a localization processor adapted to receive data from the marker detector and to generate data regarding location and orientation of the marker, the localization processor retrieving information from the database that is related to the location and orientation of the marker, the localization processor making the information retrieved from the database available to a user,
   wherein the frame of each marker is formed so as to have an exterior edge string and an interior edge string, the tracker calculating relative lengths of exterior and interior edge strings to establish the presence of a marker within an image.

2. The augmented reality system of claim 1 wherein the matrix is formed to include at least one cell reserved for marker orientation data.

3. The augmented reality system of claim 1 wherein at least some cells within the matrix contain an indicator of a portion of a numerical value.

4. The augmented reality system of claim 3 wherein the indicator within each cell is a binary indicator.

5. The augmented reality system of claim 4 wherein the binary indicator comprises: a first state indicated by a vacant cell; and a second state indicated by a nonvacant cell.

6. The augmented reality system of claim 5 wherein a nonvacant cell is occupied by a substantially opaque circle.

7. The augmented reality system of claim 1 wherein the matrix and the frame are substantially rectangular.

8. The augmented reality system of claim 1 wherein the frame is shaped so as to reveal earners when the plane is viewed from a plane not containing the frame.

9. A computer assisted localization system, comprising:
   a computer,
   a database;
   a camera;
   at least one marker containing encoded data within a matrix, said marker including a substantially opaque frame;
   a tracker, receiving images from the camera, and detecting an image of the marker within the image received by the camera, wherein said tacker includes a closed string detector for identifying a series of points within an image that form an enclosed region, and a calculator for determining a characteristic interior location for each enclosed region and identifying those regions having similarly located characteristic interior locations that correspond to marker geometry; and
   a localization processor, using data from the computer and the tracker to calculate a position of the camera within an environment, and retrieving from the database data associated with the position for display to a user of the system,
   wherein the frame of each marker is formed so as to have an exterior edge string and an interior edge string, the tracker calculating relative lengths of exterior and interior edge strings to establish the presence of a marker within an image.

10. The system of claim 9, wherein the marker further comprises:
    a matrix of rows and columns forming cells within the frame; and
    a series of substantially opaque indicators occupying at least some of the cells so as to indicate orientation and identification of the marker.

11. The system of claim 10 wherein the frame of each marker includes a plurality of corners, the tacker detecting the corners in order to establish the presence of a marker within an image.

12. A method of selecting database images and data for use in an augmented reality system, comprising the steps of:
    marking items within an environment with respective markers that indicate marker orientation and item identification, each marker including a substantially opaque frame formed so as to have an exterior edge string and an interior edge string;
    viewing the items with a camera interconnected to a computer which accesses the database;
    detecting the markers viewed by the camera, wherein detecting includes calculating relative lengths of exterior and interior edge strings to establish the presence of a marker; and
    associating particular images and data with each marker for display to a user when a particular image is viewed by the camera.

13. The method of claim 12 further comprising the step of calculating a camera location based on information derived from a marker viewed by the camera, the marker identifying a best available image residing in the database corresponding to the camera location.

14. The method of claim 12 further comprising the steps of:
    calculating a camera location based on information derived from a marker viewed by the camera;
    calculating a distance between the camera location and respective virtual camera locations for which images exist in the database; and selecting an image from the database corresponding to a virtual camera location that is closest to the calculated camera location.

15. The method of claim 12, further comprising the steps of:

calculating camera orientation; and selecting an image from the database corresponding to a virtual camera having a substantially similar orientation.

16. The method of claim 12, further comprising the steps of:

determining an optical axis of the camera;

calculating an optical center of the camera; and selecting an image from the database produced from a viewpoint and in a direction substantially similar to the optical axis and the optical center of the camera.

* * * * *